United States Patent [19]

Savage

[11] Patent Number: 5,400,698
[45] Date of Patent: *Mar. 28, 1995

[54] APPARATUS FOR MOLDING AND BAKING DOUGH AND BATTER

[75] Inventor: Don H. Savage, Midvale, Utah

[73] Assignee: Scoope, Inc., Salt Lake City, Utah

[*] Notice: The portion of the term of this patent subsequent to Jul. 13, 2010 has been disclaimed.

[21] Appl. No.: 90,885

[22] Filed: Jul. 12, 1993

Related U.S. Application Data

[63] Continuation-in-part of Ser. No. 846,032, Mar. 5, 1992, Pat. No. 5,226,352.

[51] Int. Cl.6 ................................................ A23P 1/10
[52] U.S. Cl. ........................................ 99/439; 99/353; 99/426; 249/144; 249/163; 249/DIG. 1; 425/383; 425/388
[58] Field of Search ................. 99/349, 428, 432, 433, 99/439, 442, DIG. 15, 426; 206/544, 549, 564; 220/469, 912; 249/144, 160, 163, 167, DIG. 1; 425/383, 387.1, 388, 394, 398, 399, 403

[56] References Cited

U.S. PATENT DOCUMENTS

| 323,216 | 6/1906 | Haddock | 99/433 |
|---|---|---|---|
| 987,525 | 3/1911 | Wing . | |
| 1,274,349 | 7/1918 | Rateson . | |
| 1,286,651 | 12/1918 | Kendall | 249/167 |
| 1,487,906 | 3/1924 | White et al. . | |
| 1,510,279 | 9/1924 | Huth et al. . | |
| 1,728,064 | 9/1929 | Johnson | 99/375 |
| 1,794,238 | 2/1931 | McKibben . | |
| 2,233,064 | 2/1941 | Stutzner . | |
| 2,506,928 | 5/1950 | Klingbiel | 99/433 |
| 2,829,057 | 4/1958 | Voelker . | |
| 3,296,956 | 1/1967 | Turner . | |
| 3,307,502 | 3/1967 | Armour | 425/383 |
| 3,309,738 | 3/1967 | Friedman | 249/164 |
| 3,332,658 | 7/1967 | Lemelson | 249/160 |
| 3,385,205 | 5/1968 | McCloud | 249/149 |
| 4,348,949 | 9/1982 | Selleck | 99/426 |
| 4,359,443 | 11/1982 | Michaels | 249/141 |
| 4,367,243 | 1/1983 | Brummett et al. . | |
| 4,371,327 | 2/1983 | Fievez | 99/430 |
| 4,812,323 | 3/1989 | Savage . | |

Primary Examiner—Timothy F. Simone
Attorney, Agent, or Firm—Thorpe, North & Western

[57] ABSTRACT

A cup-shaped mold for the shaping and baking of bread, batter, cookie dough and other baking material comprises an upper cupped molding member and a lower, slightly larger, cupped molding member. The molding members are made from materials with different coefficients of heat transfer to create a heat differential while cooking. The molding members are placed together with the baking material between them, thereby forming the baking material into a cup-shape. During heating of the mold for baking, a plurality of springs or clamps press the molding members together at between about 0.5 and 1.0 p.s.i. to prevent escape of the baking material from the mold while allowing partial escape of moisture from the mold.

21 Claims, 5 Drawing Sheets

APPARATUS FOR MOLDING AND BAKING DOUGH AND BATTER

RELATED APPLICATIONS

This is a continuation-in-part to application Ser. No. 07/846,032, filed Mar. 5, 1992, which issued on Jul. 13, 1993, under U.S. Pat. No. 5,226,352.

FIELD OF THE INVENTION

The present invention concerns apparatuses of and methods for molding dough or batter ("baking material") into a particular shape and subsequently or simultaneously baking it. The invention particularly concerns systems which mold and bake the baking material in a shape of a cup or frustum.

BACKGROUND OF THE INVENTION

A number of inventions regarding the molding and baking of unleavening baking material resulting in wafer-like confections such as ice cream cones and the like have been described in the prior art, e.g., McKibben, U.S. Pat. No. 1,794,238. Other inventions have dealt with the molding and baking of pie crusts, including Voelker, U.S. Pat. Nos. 2,829,057, Stutzner, 2,233,064, and Wing, 987,525.

It has been found desirable to mold or form baking material into different shapes which can be baked and marketed as novelty items and/or as substitutes for dishes. Baking material as used herein refers to leavened or leavening doughs or batters. Many prior art apparatuses and techniques mold and bake the baking material of breads, cakes, cookies, and other baked goods into various shapes including containers which may be used to hold other foods. For example, Savage, U.S. Pat. No. 4,812,323, discloses a method for molding and baking cookie dough into a cupped shape which can then be used to hold ice cream or other confection. Brummett et al., U.S. Pat. No. 4,367,243, discloses a method for preparing pizza crust. Turner, U.S. Pat. No. 3,296,956, discloses a molding and baking apparatus for the baking of bread dough into a cup-like shape. White, U.S. Pat. No. 1,487,906, discloses a pan for baking cake dough into a container shape for holding ice cream. Other prior art references of interest include Huth et al., U.S. Pat. Nos. 1,510,279, and Rateson, 1,274,349.

It has been found desirable to facilitate the partial escape of moisture from these apparatuses in order to develop a degree of porosity in the final baked product. At the same time, however, the dough must absorb some moisture to prevent excessive dehydration. It therefore becomes necessary to contain the baking material at a pressure sufficient to limit the extent to which water is converted to steam, since the baking material absorbs steam less easily than water, while allowing for a degree of conversion and escape. The baking material must also be contained to prevent the escape of the baking material itself from the baking cavity or mold space due to its expansion during baking.

Some prior art systems, such as those disclosed in Turner and White, simply allow for the escape of gases without regard to the fact that baking material will tend to escape by the same means. Huth and Rateson likewise do not attempt to prevent the escape of the baking material, but rather provide sharp edges on the perimeter of their baking containers which cut off the baking material that does escape in order to form a visually pleasing final product. Savage does not deal with the problem at all. Brummett addresses the problem by providing a lower mold into which an upper mold tightly fits. The fit between the molds ideally is tight enough to prevent the escape of dough but not so tight as to prevent the partial escape of moisture from the apparatus. Though this apparatus is effective when the proper level of pressure between the molds is attained, taking into account cooking temperature, duration, and type of baking material, it will be appreciated that the exact pressure exerted by the fit is difficult to determine, and that it is similarly difficult precisely to adjust the pressure pursuant to differing circumstances.

Savage discloses various advantages of differential heat application in these apparatuses, including uniform baking and gas dispersion. Co-pending application 07/846,032 discloses the use of two molds, one of which is coated with a darkly colored material to absorb more heat, creating a heat differential at opposing cooking surfaces within the cooking apparatus. While accomplishing the goal of creating a heat differential, the coating is cumbersome, and may result in occasional flaking and non-uniform heat distribution.

OBJECTS AND SUMMARY OF THE INVENTION

It is therefore an object of the present invention to overcome the shortcomings of the prior art.

It is a further object of the invention to mold baking material in an enclosure of a desired shape and bake the baking material in the enclosure while maintaining at a precise or desired pressure level.

It is a further object of the invention to allow for the partial escape of moisture and gas from a shaping enclosure during baking while inhibiting the formation of steam and preventing the escape of baking material from the mold cavity.

It is a further object of the invention to provide for the convenient adjustment of pressure during baking in apparatuses for forming and baking the baking material.

It is a further object of the invention to provide a novel way of differentiating the heat applied to opposing surfaces of the molding and baking apparatus.

In accordance with a first aspect of the invention, an apparatus for forming and baking dough and batter in a predetermined shape comprises a first mold having a first flange extending from its perimeter, the second having a second flange extending from its perimeter, the second flange being substantially co-extensive with the first flange, whereby a closed cavity for placement of the baking material is formed when the first and second molds are placed together, and pressure limiting means extrinsic to the molds and flanges for pressing the first and second flanges together to a predetermined degree when the first and second mold members are placed together. In a preferred embodiment, the pressure limiting means comprises a spring.

In accordance with a second aspect of the invention, a pan for molding dough into a desired shape and baking the baking material in that shape upon the application of heat comprises a upper mold having first and second opposing surfaces with a common perimeter, the first surface being shaped to mold a first side of the baking material, and a lower mold having third and fourth opposing surfaces with a common perimeter, the third surface being shaped to mold a second side of the baking material and being adapted to receive the first surface in nesting engagement forming a shaped enclosure or cavity therebetween. A first flange extends from the perimeter of the upper mold and a second flange extends from the perimeter of the lower mold approximately parallel to the first flange when the upper and lower molds are in nesting engagement. The first flange is adapted to lie upon the second flange when the upper and lower molds are in nesting engagement. Pressure means extraneous to the upper and lower molds and flanges are provided to press the first and second flanges together at a predetermined pressure.

Specifically, and in a preferred embodiment, an apparatus for shaping baking material into a cupped shape and baking it in that shape while providing for partial release of moisture and preventing escape of the baking material from the apparatus comprises an upper cup-shaped, projecting mold, a first flange extending approximately horizontally out from the perimeter of the upper mold, a lower, cup-shaped, hollow mold into which the baking material is placed, the lower mold being shaped similarly to and sized slightly larger than the upper mold and adapted to receive the upper mold in nesting position and thereby form a cup-shaped cavity of predetermined thickness between the upper and lower and lower molds and force the baking material to conform to the shape of the cavity, and a second flange substantially coextensive with the first flange extending approximately horizontally out from the perimeter of the lower mold member. The first flange lies upon the second flange along the entire lengths of the first and second flanges when the upper mold is nested into the lower mold, and means extraneous to the molds and flanges are provided for pressing the flanges together at a precisely determined pressure.

BRIEF DESCRIPTION OF THE DRAWINGS

These and other objects, aspects, and embodiments of the present invention are described in the following specification with reference to the attached drawing figures, of which.

DETAILED DESCRIPTION OF THE INVENTION

Figure 1:
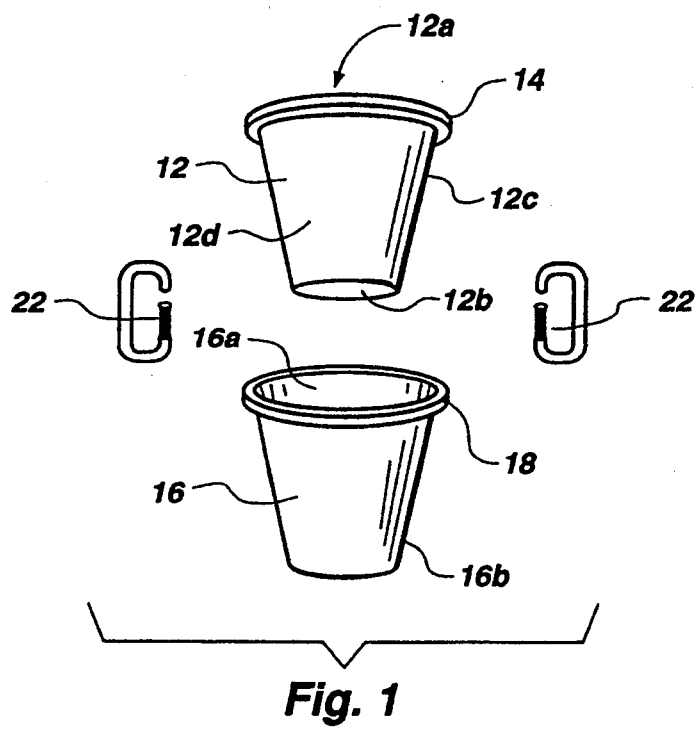
FIG. 1 is a perspective view of an example of a mold apparatus according to the invention, with the upper and lower mold members and springs separated.
Figure 3:
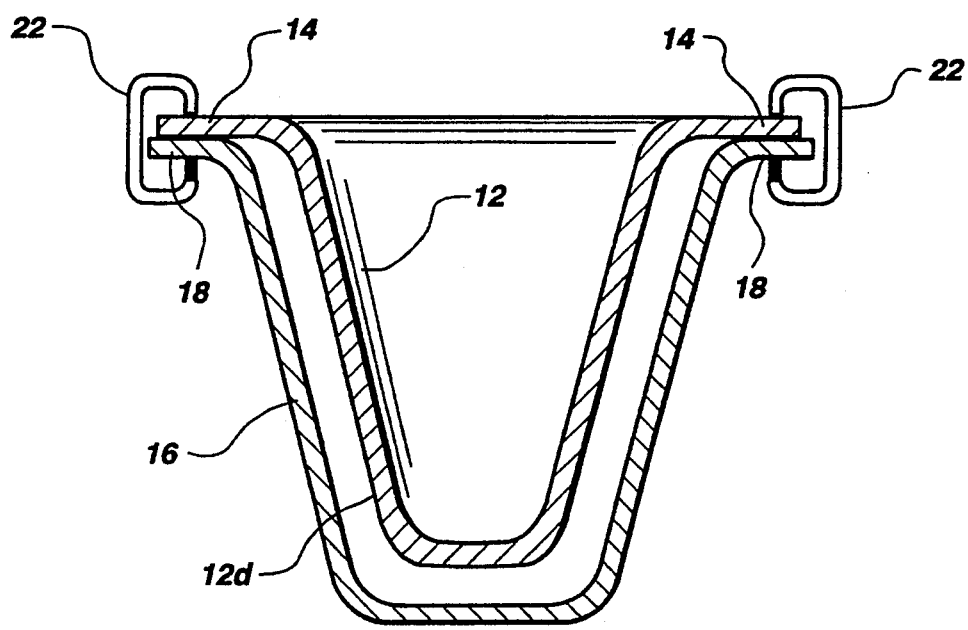
FIG. 3 is a side view in cross-section of the mold apparatus of FIG. 1 with the upper and lower mold members and springs in engaged relationship.
Figure 2:
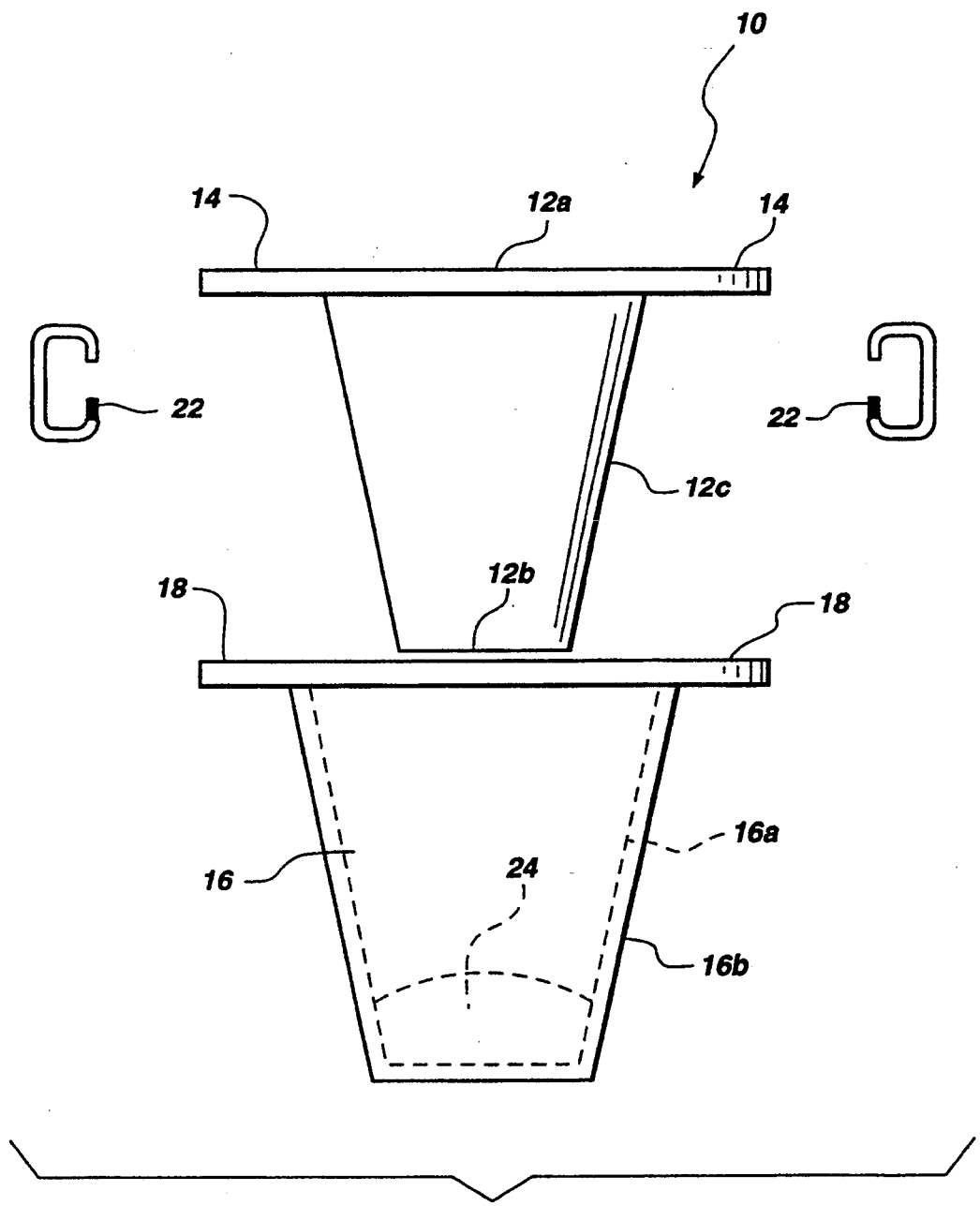
FIG. 2 is a side elevational view of the mold apparatus of FIG. 1.

Referring first to FIGS. 1 to 3, a molding and baking pan 10 according to the invention is adapted to shape or mold baking materials for cookies, bread, or other baking goods into a cup-like shape and bake the baking material in that shape upon the application of heat to the pan. The pan 10 comprises a frustoconical upper mold or mold member 12 having a lower circular closed end 12b and a sloped wall 12c extending up and radially out from the perimeter of the closed end 12b, forming an upper open end 12a at its upper edge. A flange 14 extends horizontally and radially outward from the upper edge of the wall 12c. The junctures between the closed end 12b and the wall 12c and between the wall 12c and the flange 14 are preferably rounded to a radius of approximately ⅛ to 3/16 inches since sharp edges are heat sinks; if the junctures were not rounded, heat during baking would concentrate on the edges making the heating in the mold 12 undesirably non-uniform. Edges at the top of the mold, however, specifically at the juncture of the flange 14 and the wall 12c, are of less importance than edges in the body of the mold.

The mold 12 is preferably a uniform thickness of approximately 0.035–0.05 inches. The mold 12 therefore may be constructed of a single sheet of mild carbon steel or stainless steel (soft steel) formed into the desired shape. The outward radial sloping of the wall 12c eases removal of the baking material. It will be appreciated by those skilled in the art that other shapes and geometries of the mold 12 are possible, and that the specifics of material of which it is made can be changed without departing from the scope of the invention. For example, the mold may be formed as a hemisphere, cone, or other shape and may be constructed of cast iron or other material. Additionally, it can be stamped from a solid piece of material instead of formed from a sheet.

The pan 10 further comprises a lower mold or mold member 16 adapted to be placed in nesting engagement with the upper mold 12. It is anticipated that the lower mold 16 will be placed directly underneath the upper mold 12 so that they nest in a vertical direction. The lower mold 16 is of substantially the same shape as the upper mold 12 in the preferred embodiment and is of a similar thickness. The lower mold, however, is made of a material with a coefficient of heat transfer of at least twice that of the upper mold. For example, if soft steel is used for the upper mold, the coefficient of heat transfer being 0.00063 Btu/second, the material comprising the lower mold should have a coefficient of heat transfer of at least about 0.00126 Btu/second. Preferably, the material comprising the lower mold will have a coefficient of heat transfer of more than three times the material of the upper mold. Thus aluminum (coefficient of heat transfer 0.00203) or even copper (coefficient of heat transfer 0.00404) are preferred for use in the lower mold.

This higher coefficient of heat transfer in the lower mold 16 causes the lower mold to absorb more heat than the upper mold 12 during heating of the pan 10, creating a heat differential or gradient through the baking material. The advantages of a heat differential are discussed in Savage, U.S. Pat. Nos. 4,812,323 and 5,226,352, hereby incorporated by reference as though fully set forth herein.

The lower mold 16 is slightly larger than the upper mold 12 so that the mold 12 can fit into the mold 16 in nesting engagement forming a frustoconical enclosure 20 between the exterior surface 12d of the mold 12 and the interior surface 16a of the mold 16. The baking material is molded and baked in the enclosure 20, which has a uniform thickness of approximately one centimeter or less in a preferred embodiment.

The flange 14 rests upon the flange 18 when the molds 12 and 16 are nested, sealing off the enclosure 20 at its upper edge. After the molds are placed in this position, a plurality of pressure limiting means in the form of springs 22 press the flanges 14 and 18 together at a predetermined pressure. The springs 22 are conventional steel coil springs in the illustrated embodiment, but may alternatively comprise any suitable pressure limiting means, particularly those which are extrinsic to the molds and flanges themselves, i.e., means other than the weight of the flange 14 on the flange 18 or fit between the molds or flanges. Whatever clamping or pressing means is used preferably is easily adjustable.

The pressure seal of the flanges is maintained at a pressure level where conversion of water (a liquid) to steam (a gas) is inhibited so that the baking material can absorb moisture more readily (absorption of water is easier in its liquid form). The seal must, however, be partial so that some moisture is released in order to allow the baking material to develop some porosity as it bakes. A partial seal as contemplated by the invention results in the dough baking into a desirable layered closed grain texture. The pressure seal also prevents baking material from escaping from the enclosure 20 during baking. Leavened or leavening baking material expands while it bakes, thus tending to escape any closely confined enclosure unless the enclosure is pressure sealed.

The springs or other pressure limiting means can also be adjusted so that a gap between the upper and lower molds 12, 16 is sufficiently narrow to capture baking material processed between the molds to form a seal around the mold activity.

In a particular embodiment in which the pan 10 is adapted to mold and bake cookie dough, the springs 22 apply a pressure of up to approximately 1.0 pound per square inch (psi), or more specifically between 0.5 to 1.0 psi, on the flanges 14, 18. The pressure may be varied according the particular texture of the baked good desired, the type of baking material used in the pan, and contemplated baking time.

In operation of the pan 10, an appropriate amount of baking material 24 is placed in the lower mold 16. The baking material can be previously proofed (raised), if needed, before placement in the lower mold 16, or it can be proofed in the mold 16 itself. Many types of baking material, conventional cookie dough for example, do not require proofing in which case the baking material is placed in the lower mold 16, molded, and baked immediately after mixing. To mold the baking material, the upper mold 12 is placed in nesting position into the lower mold 16 in order to compress the dough 24 between the molds and force it into the frustoconical shape defined by the enclosure 20. The springs 22 are then applied to the flanges 14 and 18, pressing them together at a suitable predetermined pressure as discussed above.

After the springs 22 are applied, the pan 10 is subjected to heat to bake the baking material which has been shaped therein. A heat differential is established between the upper mold 12 and the lower mold 16. In order to establish a heat differential, the lower mold is made of a material with a coefficient of heat transfer at least twice the coefficient of heat transfer of the material comprising the upper mold, and is preferably three times the coefficient of the upper mold as in the soft steel aluminum combination discussed above. The steel/aluminum combination is particularly beneficial as both materials are suitable for press molding into a desired shape, reducing production costs.

Figure 4:
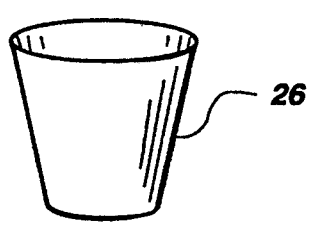
FIG. 4 is a perspective view of a bread cup baked in the mold apparatus of FIG. 1.

After the baking material 24 is molded and baked by the application of heat to the pan 10, the springs 22 are removed and the upper mold 12 is taken out of its nesting position in the mold 16. The baked material is then removed from the lower mold 16. The result is a baked good 26 as shown in FIG. 4, which is frustoconically shaped and ready to eat. If the baked good is a cookie, it may be filled with ice cream, pudding, or other sweet filling for a dessert pastry. If it is bread, it may be filled with chili, soup, or the like, thus taking the place of a dish which must be washed or thrown away. It has been found that a particular bread baked according to the invention is capable of holding hot water for approximately 30 minutes without leaking.

Figure 5:
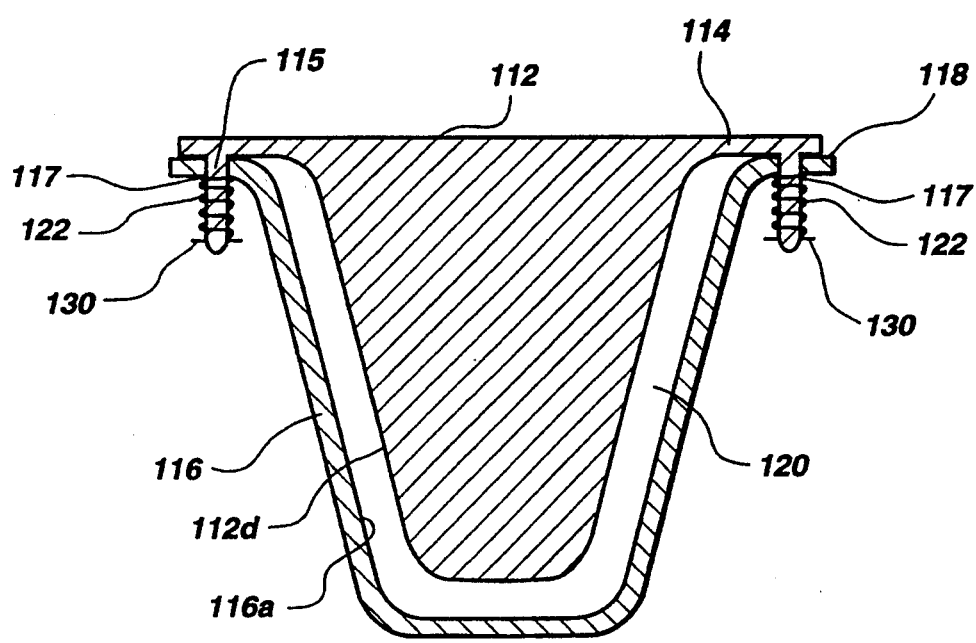
FIG. 5 is a side view in cross-section of a second example of a mold apparatus according to the invention.

Referring now to FIG. 5, another example of a pan 110 according to the invention comprises an upper mold 112 which is similar to the mold 12 except that the mold 112 is formed from a solid piece of metal instead of a bent sheet. Additionally, a flange 114 extending from the upper mold 112 contains one or more guide pins 115 depending downwardly therefrom, a flange 118 extending from the lower mold 116 comprises one or more guide holes 117. When the guide pins 115 are placed into the guide holes 117, the upper mold 116 is longitudinally centered within a cavity defined by the lower mold 112, with any given point along a horizontal plane being equidistant from the lower mold. It will be apparent that such guide pins or other centering means could be placed away from the flanges, such as between mold cavities, opposite to corresponding openings in the opposing plate surfaces.

An exterior face 112d of the upper mold 112, which contacts the baking material, is preferably of approximately the same shape as an interior face 116a of the lower mold 116, which contacts the baking material. The remainder of either mold can be shaped or thickened as desired, keeping in mind that baking times, configurations, and temperatures will need to be adjusted accordingly. The faces 112d, 116a of the molds can also vary from each other in shape, if desired, if the shape of the final baked product is desired to be of non-uniform thickness.

The solid nature of the mold 112 causes it to impart a lower temperature to the dough than the lower mold and thereby differentiate the applied heat. Differential heating could also be accomplished by providing dead air space in the body of the mold 112.

The lower mold 116 of the pan 110 is similar in all respects to the mold 16 except that the flange 118 contains guide holes 117 adapted to engage the guide pin 115 when the molds are nested. This engagement results in a more effective seal between the flanges 114 and 118 when a pressure limiting means in the form of a spring 122 is applied and, further, precisely centers the upper mold 112 in the lower mold 116 so that the enclosure 120 therebetween is of uniform thickness. As is shown in FIG. 5, the pressure limiting means can be springs attached to the guide pins 115, with some type of stopping device 130 for keeping the guide pin 115 in place and keeping the spring 122, pressurized during baking.

Figure 6:
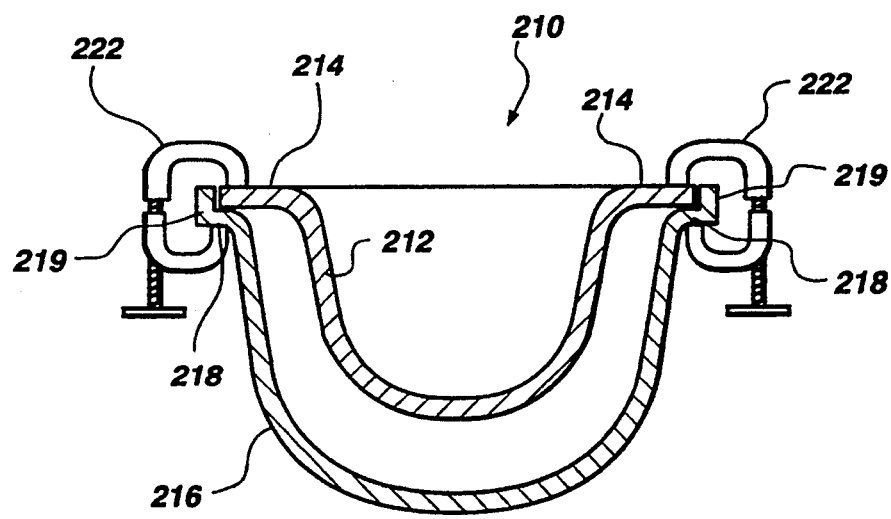
FIG. 6 is a side view in cross-section of a third example of a mold apparatus according to the invention.

Referring now to FIG. 6, an example of a pan 210 according to the invention comprises an upper mold 212 which is similar to the mold 12 except that it is shaped as a hemispherical dome instead of a frustum. A first flange 214 horizontally extends from the upper edge of the mold. A lower mold 216 is similar to the mold 16 except that it has the shape of a hemispherical cavity instead of a frustum, and contains a short flange 219 extending upwardly from the horizontal flange 218 at its top edge. The perimeter of the first flange 214 fits snugly into the circle formed by the vertical flange 219.

This flange configuration improves sealing and centers the upper mold 212 in the lower mold 216. In addition, sealing is also improved by the use of pressure limiting means in the form of clamps 222.

Figure 7:
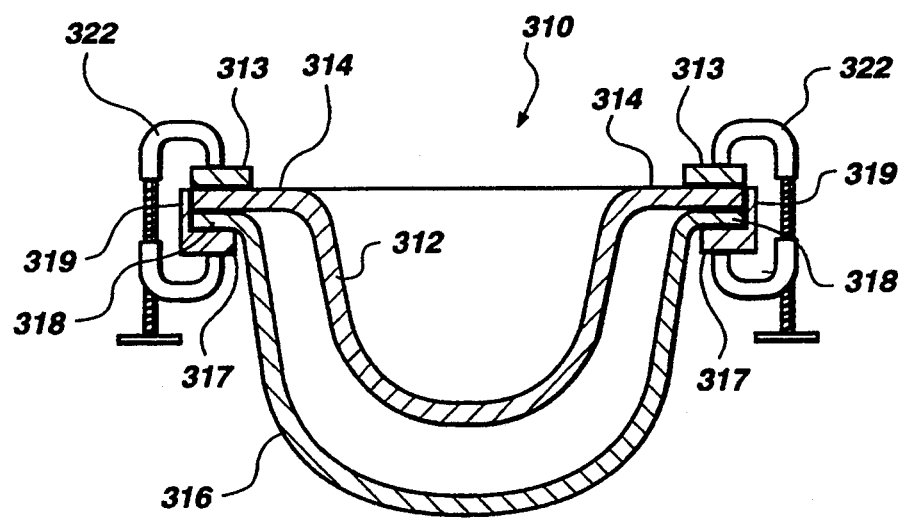
FIG. 7 is a side view in cross-section of a fourth example of a mold apparatus according to the invention.

Referring now to FIG. 7, an example of a molding and baking pan 310 according to the invention comprises an upper mold 312 similar to the mold 212 except that a support ring 313 is secured to the top of a first flange 314 by screws or other suitable means. The ring 313, made of brass in the preferred embodiment, provides a solid base for the application of pressure limiting means in the form of clamps 322 against the flange 314. The lower mold 316 is similar to the mold 216 except that it does not integrally contain a vertical flange. Instead, a support ring 317, constructed of aluminum in the preferred embodiment, is secured to the bottom of a second flange 318. The support ring 317 contains a vertical flange 319 which extends upwardly at the perimeter of the upper and lower flanges 314 and 318 and performs the same functions as the vertical flange 219 in FIG. 6. The ring 317 provides a solid base for the application of the clamps 322 against the flange 318.

Figure 8:
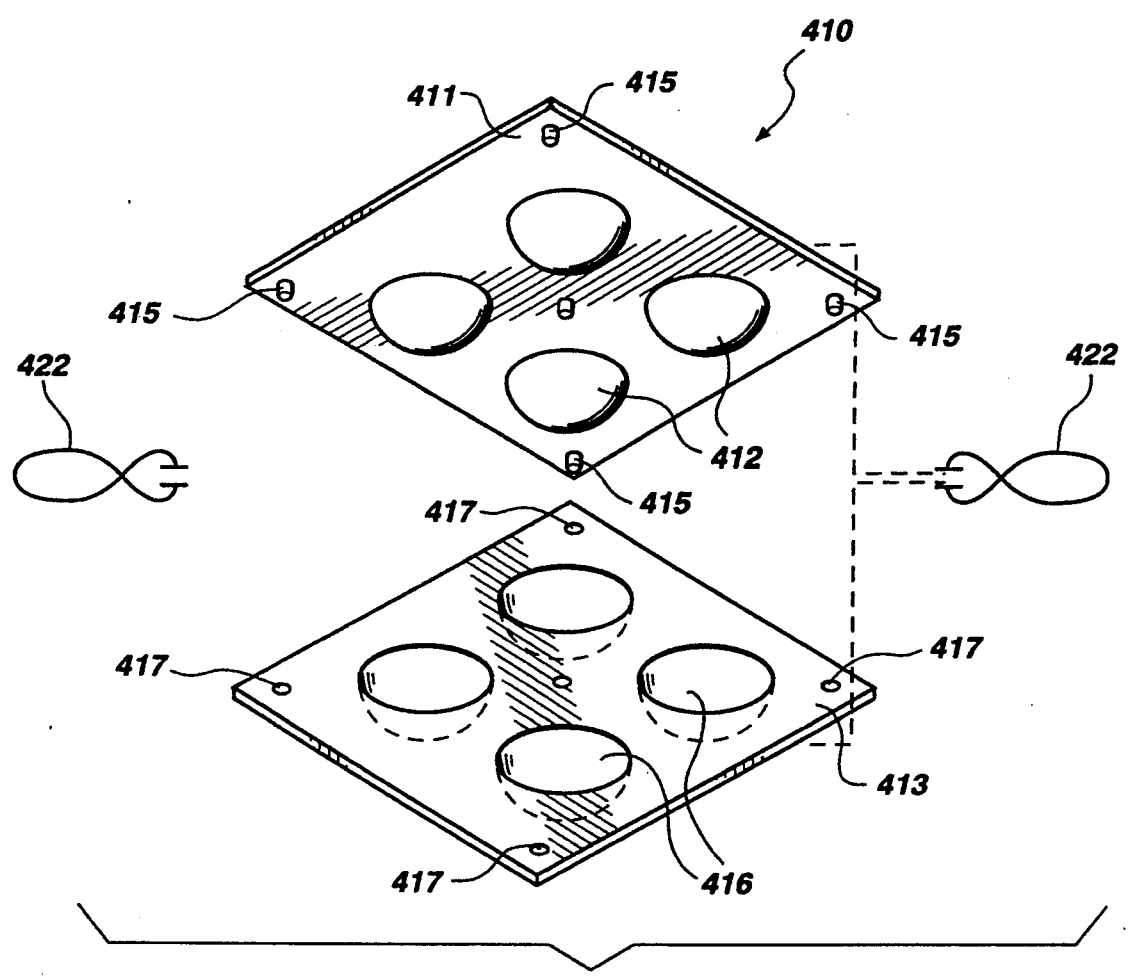
FIG. 8 is a perspective view of an example of a multiple-cavity mold apparatus according to the invention.

Referring now to FIG. 8, a multi-cavity shaping and baking pan 410 according to the invention is shown. The pan 410 comprises a flat rigid upper support plate 411 having a plurality of upper molds 412 depending downwardly therefrom and a plurality of guide pins 415 depending downwardly therefrom. The molds 412 are hemispherical in the embodiment shown, but may be of any suitable shape as earlier discussed. A flat rigid lower support plate 413 has a plurality of lower molds 416 depending downwardly therefrom and a plurality of guide holes 417 therein. The upper molds 412 are adapted to nest into the lower molds 416 forming enclosures for the molding and baking of baking material. When the molds are nested, the support plate 411 rests upon the support plate 413, the guide pins 415 nesting in the guide holes 417 and pressure limiting spring clamps 422 press the plates 411 and 413 together at a predetermined pressure. Thus the plates 411 and 413 take the place of the flanges described earlier in previous embodiments. The plates alternatively may be viewed simply as rigid flanges of each mold cavity to the flanges of the others.

It will be appreciated from the description of the pan 410 that the spring clamps or other pressure means need not be applied directly at the perimeter of the molds but may be farther removed therefrom if means are provided to impart the applied pressure to the perimeter of the enclosure.

It will be understood that variations and modifications of the described embodiments will be apparent to those skilled in the art without departing from the scope of the invention. The described apparatuses and methods are not meant to be a delineation of the scope of the invention but merely as examples of possible embodiments.

I claim:

1. An apparatus for forming and baking material in a predetermined shape comprising:
   an upper mold comprising a downward projecting forming element and having a first coefficient of heat transmission;
   a lower mold comprising a cavity larger than the forming element of the upper mold and having a second coefficient of heat transmission which is at least twice the coefficient of heat transmission of the first coefficient of heat transmission;
   wherein a closed mold cavity of a cupped shape for placement of the material is formed when the first and second molds are placed together;
   wherein the higher coefficient of heat transmission of the lower mold causes more heat to be transferred to the material from the lower mold than heat transferred to the material from the upper mold; and
   centering means for aligning the upper and lower molds such that the downward projecting forming element of the upper molds is approximately equidistant from lateral walls defining the cavity of the lower mold.

2. An apparatus as defined in claim 1, wherein the centering means comprises a first and a second flange, the first flange being connected to the upper mold and the second flange being connected to the lower mold.

3. An apparatus as defined in claim 1, wherein the centering means comprises guide pins connected to a mold and guide pin holes connected to the other mold.

4. An apparatus as defined in claim 1, wherein both molds comprise metals suitable for press molding to a desired shape.

5. An apparatus as defined in claim 4, wherein the upper mold having a first coefficient of heat transmission is steel.

6. An apparatus as defined in claim 5, wherein the upper mold having a first coefficient of heat transmission is soft steel with a coefficient of heat transmission of approximately 0.00062 Btu/second.

7. An apparatus as defined in claim 4, wherein the lower mold having a second coefficient of heat transmission is aluminum.

8. An apparatus as defined in claim 7, wherein the aluminum has a coefficient of heat transmission of approximately 0.00203.

9. An apparatus as defined in claim 4, wherein the upper mold having a first conductivity is a metal other than aluminum.

10. An apparatus as defined in claim 1, further comprising a pressure limiting means for maintaining pressure between the molds while baking the material.

11. An apparatus as defined in claim 10, wherein the pressure limiting means comprises a spring biasing means coupling the first and second molds into a contacting relationship to provide a seal for the closed mold cavity.

12. An apparatus as defined in claim 11, wherein the pressure limiting means maintains a pressure within the mold cavity of less than approximately 5 psi.

13. An apparatus as defined in claim 12, wherein the pressure limiting means operates to retain pressures within the mold cavity at a pressure approximately equal to 1 psi.

14. An apparatus as defined in claim 12, wherein the spring biasing means comprises a coiled, steel spring.

15. An apparatus as defined in claim 13, wherein a contacting relationship developed by the spring biasing means between the first mold and the second mold defines a gap sufficiently narrow to capture batter processed therein to complete formation of a seal around the mold activity.

16. An apparatus for forming and baking material in a predetermined shape comprising:
   an upper mold comprising a downward projecting forming element and having a first coefficient of heat transmission, a first plate surface extending from its perimeter;

a lower mold comprising a cavity larger than the forming element of the upper mold and having a second coefficient of heat transmission which is at least twice the coefficient of heat transmission of the first coefficient of heat transmission, the lower mold having a second plate surface extending from its perimeter, the second plate surface being substantially co-extensive with the first plate surface, wherein a cupped shaped closed mold cavity for placement of the material is formed when the upper and lower molds are placed together;

the first plate surface being adapted to lie upon the second plate surface when the upper and lower molds are in nesting engagement;

pressure limiting means extraneous to the upper and lower molds and the first and second plate surfaces for pressing the first and second flanges together at a predetermined pressure.

17. An apparatus as defined in claim 16, wherein the pressure limiting means comprises a spring biasing means coupling the first and second molds into a contacting relationship to provide a seal for a closed mold cavity.

18. An apparatus as defined in claim 17, wherein the pressure limiting means maintains a pressure within the mold cavity of less than approximately 5 psi.

19. An apparatus as defined in claim 18, wherein the pressure limiting means operates to retain pressures within the mold cavity at a pressure approximately equal to 1 psi.

20. An apparatus as defined in claim 17, wherein the spring biasing means comprises a coiled, steel spring.

21. An apparatus as defined in claim 13, wherein a contacting relationship developed by the spring biasing means between the first mold and the second mold defines a gap sufficiently narrow to capture batter processed therein to complete formation of a seal around the mold activity.

* * * * *